United States Patent
Uriarte

(10) Patent No.: US 9,827,640 B2
(45) Date of Patent: Nov. 28, 2017

(54) APPARATUS AND A SYSTEM FOR AUTOMATIC TOOL CHANGE BY THREADING ENGAGEMENT FOR A CNC MILLING MACHINE

(71) Applicant: Jorge Uriarte, Irvine, CA (US)

(72) Inventor: Jorge Uriarte, Irvine, CA (US)

( * ) Notice: Subject to any disclaimer, the term of this patent is extended or adjusted under 35 U.S.C. 154(b) by 174 days.

(21) Appl. No.: 14/742,927

(22) Filed: Jun. 18, 2015

(65) Prior Publication Data
US 2016/0368108 A1 Dec. 22, 2016

(51) Int. Cl.
| | | |
|---|---|---|
| *B23Q 3/157* | (2006.01) | |
| *B23Q 3/155* | (2006.01) | |
| *G05B 19/18* | (2006.01) | |
| *B23Q 5/10* | (2006.01) | |
| B23B 31/26 | (2006.01) | |
| B23Q 5/00 | (2006.01) | |

(52) U.S. Cl.
CPC ....... *B23Q 3/15706* (2013.01); *B23Q 3/1552* (2013.01); *B23Q 3/15503* (2016.11); *B23Q 3/15553* (2013.01); *B23Q 5/10* (2013.01); *G05B 19/182* (2013.01); *B23B 31/266* (2013.01); *B23Q 3/15536* (2016.11); *B23Q 2005/005* (2013.01); *G05B 2219/45145* (2013.01); *G05B 2219/50245* (2013.01); *Y10T 409/309464* (2015.01); *Y10T 483/10* (2015.01); *Y10T 483/12* (2015.01); *Y10T 483/132* (2015.01); *Y10T 483/179* (2015.01); *Y10T 483/1793* (2015.01); *Y10T 483/1795* (2015.01); *Y10T 483/1798* (2015.01)

(58) Field of Classification Search
CPC .. Y10T 483/115; Y10T 483/12; Y10T 483/13; Y10T 483/132; Y10T 483/134; Y10T 483/136; Y10T 483/10; Y10T 483/179; Y10T 483/1793; Y10T 483/1795; Y10T 483/1798; Y10T 409/309464; B23B 31/266; B23Q 3/15706; B23Q 3/1552; B23Q 3/15553; B23Q 3/15503; B23Q 3/15506; G05B 19/182; G05B 2219/50245
See application file for complete search history.

(56) References Cited

U.S. PATENT DOCUMENTS

| | | | | |
|---|---|---|---|---|
| 3,038,386 | A * | 6/1962 | Parske | .................. B23B 31/266 |
| | | | | 192/12 R |
| 3,590,470 | A * | 7/1971 | Brainard | .............. B23Q 3/1552 |
| | | | | 29/26 A |
| 4,602,798 | A | 7/1986 | Wettstein | |
| 4,939,834 | A * | 7/1990 | Kawasaki | ............. B23B 31/261 |
| | | | | 279/142 |

(Continued)

*Primary Examiner* — Erica E Cadugan
*Assistant Examiner* — Yasir Diab

(57) ABSTRACT

An apparatus and a system comprise a collet comprising a top portion and a bottom portion. The top portion comprises a threading means. The bottom portion at least comprises means for holding the collet from rotating and means for retaining an end mill. A master comprises a top portion and a bottom portion. The top portion is configured for engagement with a spindle of a milling machine. The bottom portion comprises a threading means for engagement with the threading means of the collet, wherein the master is retained by the spindle and the collet engages and disengages the master by rotation of the spindle. The milling machine operates under computer control during engagement and disengagement of the collet from the master.

11 Claims, 6 Drawing Sheets

(56) References Cited

U.S. PATENT DOCUMENTS

| | | | | |
|---|---|---|---|---|
| 5,193,421 A | * | 3/1993 | Meisinger | B23B 29/04 |
| | | | | 483/1 |
| 5,242,360 A | | 9/1993 | Bayer | |
| 2001/0041649 A1 | * | 11/2001 | Susnjara | B23Q 1/012 |
| | | | | 483/1 |
| 2007/0050079 A1 | * | 3/2007 | Itoh | G05B 19/40938 |
| | | | | 700/179 |
| 2007/0293379 A1 | * | 12/2007 | Feinauer | B23Q 3/155 |
| | | | | 483/1 |
| 2010/0012341 A1 | * | 1/2010 | Kosuge | B25B 21/023 |
| | | | | 173/200 |

\* cited by examiner

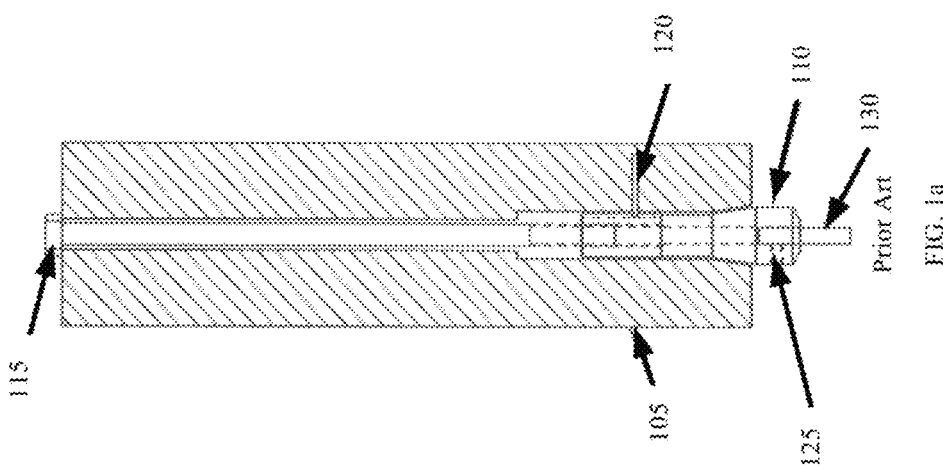
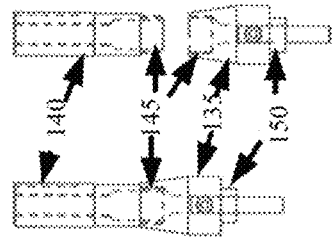
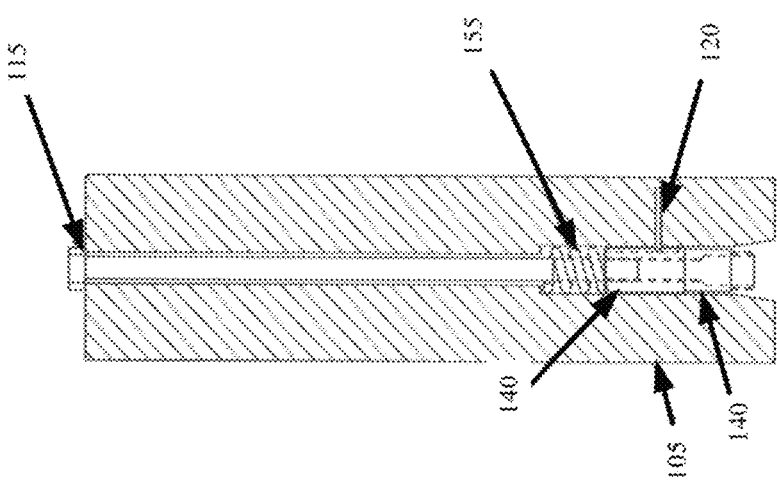
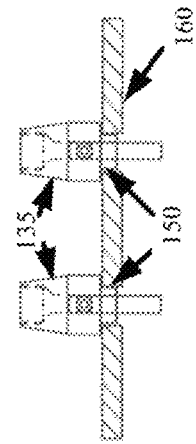

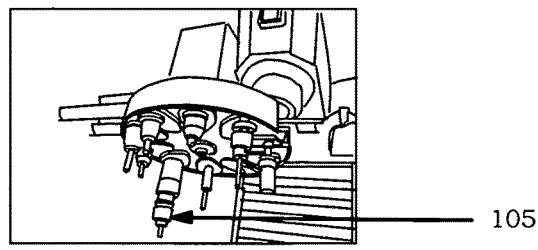
Prior Art
FIG. 2c
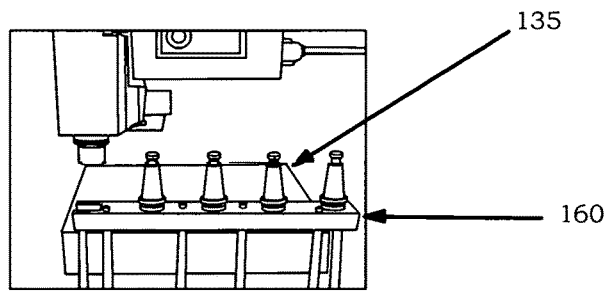
Prior Art
FIG. 2b
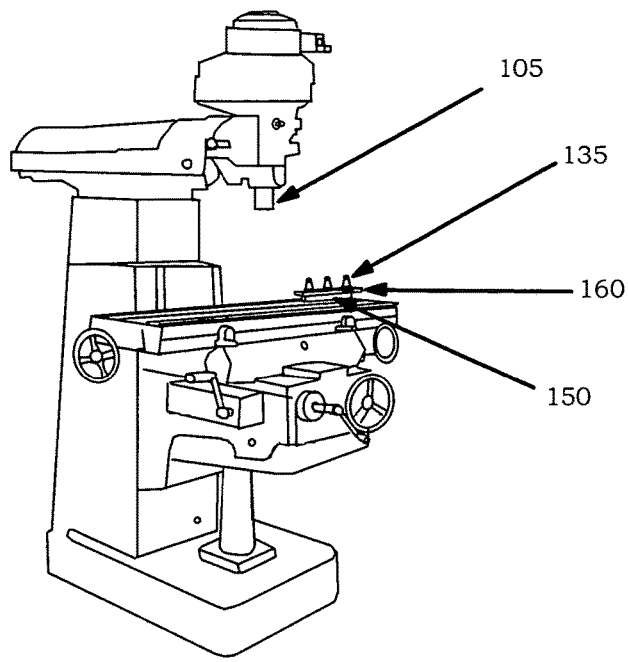
FIG. 2a
FIG. 2a-2c

APPARATUS AND A SYSTEM FOR AUTOMATIC TOOL CHANGE BY THREADING ENGAGEMENT FOR A CNC MILLING MACHINE

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to automatic tool changing by threading engagement for a CNC Milling machine. More particularly, the invention relates to machine tooling functions for hole threading, or rigid tapping.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that, the prior art discloses a collet arbor. In some instances, the prior art reflects an external perspective view of one form of an collet arbor, together with a collet of the 3AT type, by which the collet arbor is specifically adapted to accommodate. The collet arbor is a composite comprising the clamping holder, the adapter, and a bushing, which are assembled in coaxial relation together with an internal screw, to accommodate the collet. The means by which comprise an axially projecting screw, provided for securely coupling the collet arbor assemblage in axial relation to the spindle of a lathe. In alternative placements, this may take the form of a screw-threaded socket. The assemblage, including: collet, bushing, screw, adapter, and clamping holder, are fitted together in telescopic relation, forming a chuck or collet arbor for holding a tool, for example, in a fixed relation to a lathe, particularly of the computerized numerical controlled type, during turning operations. In some instances, four ¼ in. holes, which may be interposed through the wall of flange, at symmetrically-spaced positions, around its periphery, permit the adapter to be rotated by means of a spanner wrench.

In addition, the following is another example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that, the prior art discloses a spindle and tool holder for a machine tool. Furthermore, a tool holder carrier turret plate may be secured to a shaft mounted in the head and may have a plurality of circularly spaced apertures with retaining rings therein, holding a plurality of tool holders. Each of the plurality of tool holders may hold a particular tool for a particular type of machining operation to be performed by that tool on the work piece. A rotary drive for the turret plate may be provided in the head, and may be capable of positioning any one of the tool holders under the coupling plug. A computer numerical controller may also be coupled to the drive motors for the X-Y axes carriages and for the tool holder turret to position the work piece and tool holders according to a programmed sequence predetermined for the necessary operations on the work piece. In addition to the foregoing, it is also well know to those skilled in the art, complex hardware similar to rotary turrets, and air or hydraulic forces may be applied to hold collets into the spindle. Means for doing and performing these functions are all known in the art.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1a illustrates an exemplary milling machine spindle, in accordance with the prior art;

FIGS. 1b, and 1c illustrate various views of an exemplary threaded CNC automatic tool changing system, according to an embodiment of the present invention, where FIG. 1b illustrates a front internal view of the CNC automatic threading tool changing system in an exemplary sectionalized position, and FIG. 1c illustrates an automatic tool changing system in an exemplary sectionally detached position, in accordance with an embodiment of the present invention;

FIG. 2a illustrates an exemplary CNC machine tooling system with tray holder, according to an embodiment of the present invention;

FIGS. 2b and 2c illustrate exemplary tool change methods, in accordance with the prior art;

Figure 3A:
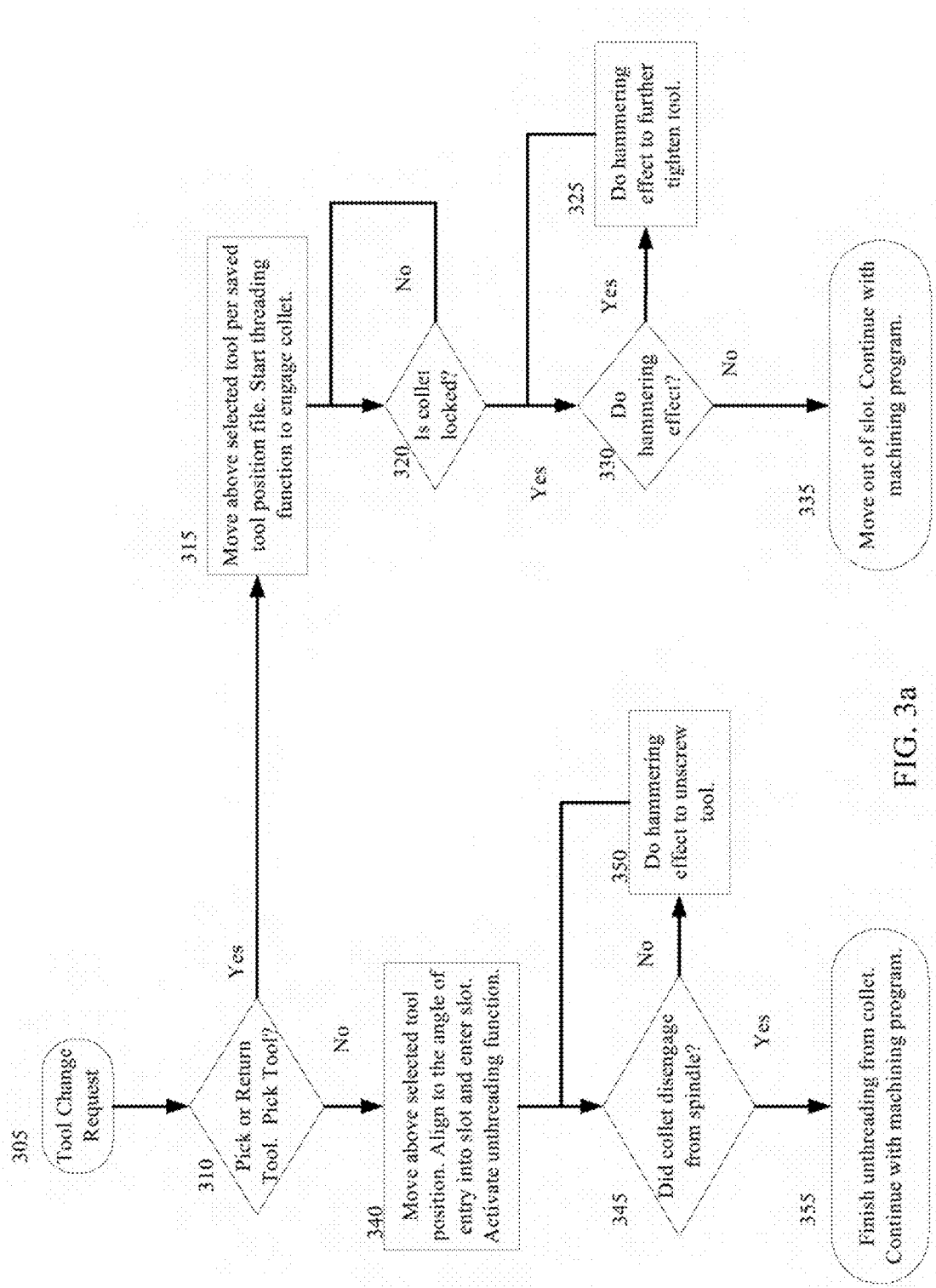
FIG. 3a illustrates an exemplary flow chart of a method for CNC automatic tool changing system, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forward most point of the upper or outsole and the rearward most point of the upper or outsole.

Similarly, term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and un contradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit —"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. §112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

A CNC automatic threading tool changing system may be used for automatically changing CNC tools through means of on/off threading each tool and preventing tool rotation during the on/off threading step by employing automatic tool changing software methods to repurpose the existing CNC hole threading function to instead be used to change a multiplicity of tools without the introduction of additional hardware to existing CNC machines. The software functions may be added to standard CNC machines to more optimally carry out the tool changing process. In some embodiments, the software methods and functions may be added to all pluralities and substructures of CNC and DNC environments, including for example, without limitation, vertical and horizontal environments depending upon application. In some embodiments, the software methods may also comprise certain steps to be performed before and after executing the CNC hole threading function.

A threaded CNC tool changing system may be incorporated by duplicating an end mill holder through means of dividing the tool and adding matching thread means, mounting said tool parts within a collet tray, using the machine normal functions forward and reverse spindle rotation, the up and down spindle travel, the X and Y table travel, and the threading function, to accomplish a tool change. In a tool pick-up operation, the spindle may screw into the collet, and screw out to leave the collet on the tray. The collet and collet tray may have engagement means, much like, without limitation, a nut and a wrench, to hold the collet from rotation during the threading operation of pick up and release. The master tool holder and the collet may both engage by means of threading functions. The operations of the threaded CNC tool changing system may be employed entirely through software. The software incorporated may be used to complement the existing functions of the CNC machine to automatically realize, initiate, and perform a tool change. The software functions may include controls for positioning the spindle rotation at a particular angle, controls to detect spindle rotation or locked condition, controls to tighten or untighten using a "hammer effect" to lock or unlock the tool to the spindle, controls for setting the starting angle before threading into the tool, and controls which determine the distance of the spindle above the tool, before the threading function, to be a multiplicity of the thread pitch used.

In some embodiments, the collet and collet tray engagement of holding the collet from rotation during threading operations may employ a holding means like flats means at the collet so as to prevent the collet from behaving in a wrench-like manner when seated at the collet tray. The collet tray may incorporate, for example, without limitation, any plurality of openings, or slits, or slots to accept and hold collets from rotating during threading and unthreading operations. The plurality of openings within the collet tray may be of any plurality or configuration of shape, size, orientation, and geometry.

FIG. 1a illustrates an exemplary milling machine spindle, in accordance with the prior art. FIG. 1a shows a front internal view of an exemplary milling machine spindle, whereby a typical spindle 105 may secure a standard end mill tool holder 110 with a drawbar 115. A pin 120 holds end mill master tool holder 110 from rotating while being secured by the drawbar 115. The end mill (cutting tool) 130 is inserted into the end mill master tool holder and secured with a setscrew 125.

FIGS. 1b, and 1c illustrate various views of an exemplary threaded CNC automatic tool changing system, according to an embodiment of the present invention. FIG. 1b illustrates a front internal view of the CNC automatic threading tool changing system in an exemplary sectionalized position, in accordance with an embodiment of the present invention. In some embodiments, the end mill master tool holder 110 may be divided and used with the original spindle 105. In some embodiments, the collet 135, and a master 140 may have a matching threading means 145. In some embodiments, collet 135 may have a holding means like flats 150.

FIG. 1c illustrates the automatic tool changing system shown in FIG. 1a in an exemplary sectionally detached position, in accordance with an embodiment of the present invention. A spring 155 may be inserted into the spindle 105 followed by master 140 and secured by drawbar 115. Pin 120 may hold master 140 from rotating. The spring 155 secures and allows for proper high adjustment of master 140. The correct high adjustment may be achieved when the collet 135 is screwed into the master 140 and seats against the spindle 105 cavity rather than against the master thread limit. Also illustrated in FIG. 1c, a collet tray 160 may be secured at the milling machine table, whereby the collet tray 160 may have openings to accept the collets 135 with the holding means like flats 150 inserted into the collet tray 160.

FIG. 2a illustrates an exemplary CNC machine tooling system with tray holder, according to an embodiment of the present invention. FIG. 2a shows a diagonally displaced front external view thereof. FIG. 2a shows a typical CNC machine mounted with a spindle 105, and a collet tray 160 including collets 135. The automatic tool change may use the available CNC functions including forward and reverse spindle rotation, the up and down spindle travel, the threading functions, the X and Y table travel functions, and preprogram tool location and change software. To pick-up a collet 135, the table may move and align the selected collet under the spindle 105. The spindle will extend, and with the threading means 145 may screw the master 140 into the collet 135. After use, the collet 135 acting as the holding means like flats 150 may be aligned to the collet tray 160 openings, and be replaced in the collet tray. In the reverse function, it will unthread up and be ready for the next collet 135. CNC machines with a hole threading function, also known as a Rigid Tapping function, may utilize a spindle encoder. The spindle encoder generates a fixed number of pulses per spindle rotation. By synchronizing the pulses with the Z axis motion at a particular rate, the spindle 105 may generate an elliptical motion that may match any screw pitch. The spindle encoder may also include an index which generates one pulse per rotation and it is typically used to control the spindle RPM.

FIGS. 2b and 2c illustrate exemplary tool change methods, in accordance with the prior art. Typically, prior art may use complex hardware like rotary turrets, in FIG. 2c and use air or hydraulics force to hold collets into the spindle.

In some embodiments, of the present invention, further software controls may be added to the original software to accomplish automatic tool change. The following software controls may comprise, but not limited to, software to detect that the spindle has stopped rotating and/or tightening. In addition, the software controls may also detect the untightening of the spindle 105 to collet 135, as well as the alignment of the collets holding means like flats 150 for docking into collet tray 160 slots.

Figure 3B:
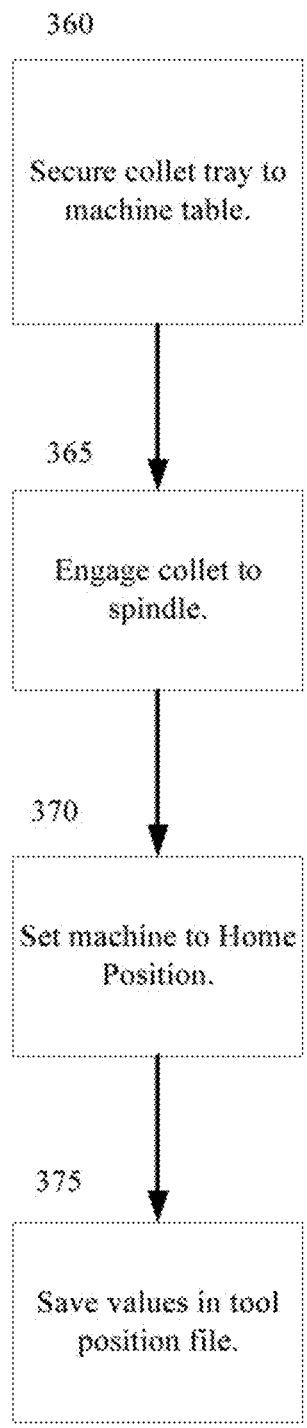
FIG. 3b illustrates an exemplary flow chart for an initial setup method, in accordance with an embodiment of the present invention.

FIG. 3b illustrates an exemplary flow chart for an initial setup method, in accordance with an embodiment of the present invention. In some embodiments, an initial setup procedure for each collet 135 may be needed before the collets may be put into use. In some embodiments, the procedures may store the X, Y, and Z values in a "tool positions file", including the angle of alignment to the tray tool holder. In some embodiments, incremental axes B, C, Q, U, V, and W, or any combination of variables may also be used to store values within the tool positions file. There may be a plurality of ways to perform the initial setup procedure. An exemplary procedure for the initial setup may be performed by first securing the collet tray 160 on the machine table in a step 360, and then manually, or through means of software or robotics, engaging the collet 135 to the spindle 105 in a step 365 using for example, but not limited to, a wrench and applying the specified torque value in order to achieve full engagement. Next, the machine may be set to the Tool Home Position in a step 370, which may allow the spindle 105 to be rotated to the proper "angle of entry" so that the collet holding means like flats 150 may align with the collet tray 160 slots and move in the X, Y, and Z axis so as to engage the collet into its corresponding tray slot resting position. Once the initial setup has been performed, the values for the collet in the tool position file may be saved in a step 375.

In some embodiments, "threading" may be used to thread into the collet (typically CW rotation), and "unthreading" to unthread out of the collet (typically CCW rotation). In some embodiments, during a pickup operation the spindle 105 may be placed above the collet 135 per the X and Y saved values. To correctly align the male and female threads in their starting positions, the threading function may start at the saved angle of alignment and at a particular distance above the Z value saved. The particular distance may be a multiple of collet thread pitch used, which is added to the Z value saved. If during a collet pickup operation, or equally an active threading function, the spindle encoder pulses stop, this may signal full engagement of the spindle 105 with the collet 135, and further threading may not be possible due to the collet being in a "locked" state.

Those skilled in the art will readily recognize, in light of the present invention, further tightening may be desired. In this instance, the software may be allowed to enter into a "hammering effect" stage. To further educate the reader, collet tray 160 slots may be very wide and may allow the collet 135 to rotate a number of degrees before it is stopped from full rotation. In using low RPM, the spindle 105 builds low inertia, activating the unthreading function until rotation is stopped by the collet tray slot. In using high RPM, by activating the threading function—even though it is a small angular rotation—the spindle 105 builds higher inertia and will hit on the threading of the spindle and collet for further tightening its engagement. This "hammering effect" can be repeated as desired to achieve further tightening.

FIG. 3a illustrates an exemplary flow chart of a method for CNC automatic tool changing system, in accordance with an embodiment of the present invention. In some embodiments, a step tool change request 305 may be initiated within the return tool system software functionality and operations. At a step 310 a determination may be made as to pick the tool, or to return the tool. If it is observed that the tool should be chosen for placement within operations, the CNC machine may move above the selected tool in a step 315, based upon the saved tool position file, and a threading function may be started thereby engaging the collet 135. At a step 320, the software may determine if the collet 135 is locked. If collet 135 is unlocked, the threading function to engage collet may be repeated step 315. If collet 135 is locked, a determination may be made whether or not the collet meets software specifications for tightness, and whether a hammering effect should ensue at a step 330. If the hammering effect is required, at a step 325 the hammering effect may be initiated until the collet meets the minimum requirements for locking tightness, whereby the process may return to step 320 for locking engagement verification. In some embodiments, a number of hammering cycles may be predetermined. If the collet is locked, and the hammering effect is not needed, at a step 335, the collet may move out of the slot, and the machining program may commence. Alternatively, if it is observed at step 310 the tool needs to be returned by means of observed software index pulse specifications indicating the tool requiring re-tooling or adjustments, the tool is returned at a step 340 whereby the CNC machine is positioned above the selected tool position, by which the angle of entry into the slot is aligned thereby making it possible to rotate the spindle until it matches the saved angle, and ensue activation of the unthreading function. At a step 345, it may be determined if the collet disengaged from the spindle. If after a certain minimum time frame the spindle encoder pulses have not yet started, it may signal that the unthreading function has failed to loosen or disengage the spindle 105 from the collet engagement. In this instance, the software may automatically enter into the hammering effect mode at a step 350, thereby allowing loosening of the spindle from the collet engagement. Within this environment, the software may use a low RPM, which builds low spindle inertia, activating the threading function until rotation is stopped by collet tray slot. Next, the software engages a high RPM to activate the unthreading function so as to hit on the threading of the spindle 105 and collet 135 to loosen its tightness. This hammering effect may be repeated until collet is loosened from the spindle. Once the collet has been loosened from the spindle, the spindle may complete unthreading out of the collet and leave the collet on the collet tray 160 holder. If at step 345 the collet did disengage from the spindle, a step 355 finishes unthreading the collet, and the machining program ensues.

In some embodiments, it is contemplated that in lieu of using slit like tools, it may be possible to use standard collets, and other similar collet designs or variations thereof as known to those skilled in the art, but it will be necessary to add a holding means like flats implementation to the overall system. Other variations may include removing pin 120 to allow the collet 135 to rotate during threading and unthreading sequences, and to lock the drawbar 115 from rotation which may be easily done in crossing the pin through the top of the spindle 105 and the drawbar 115.

Figure 4:
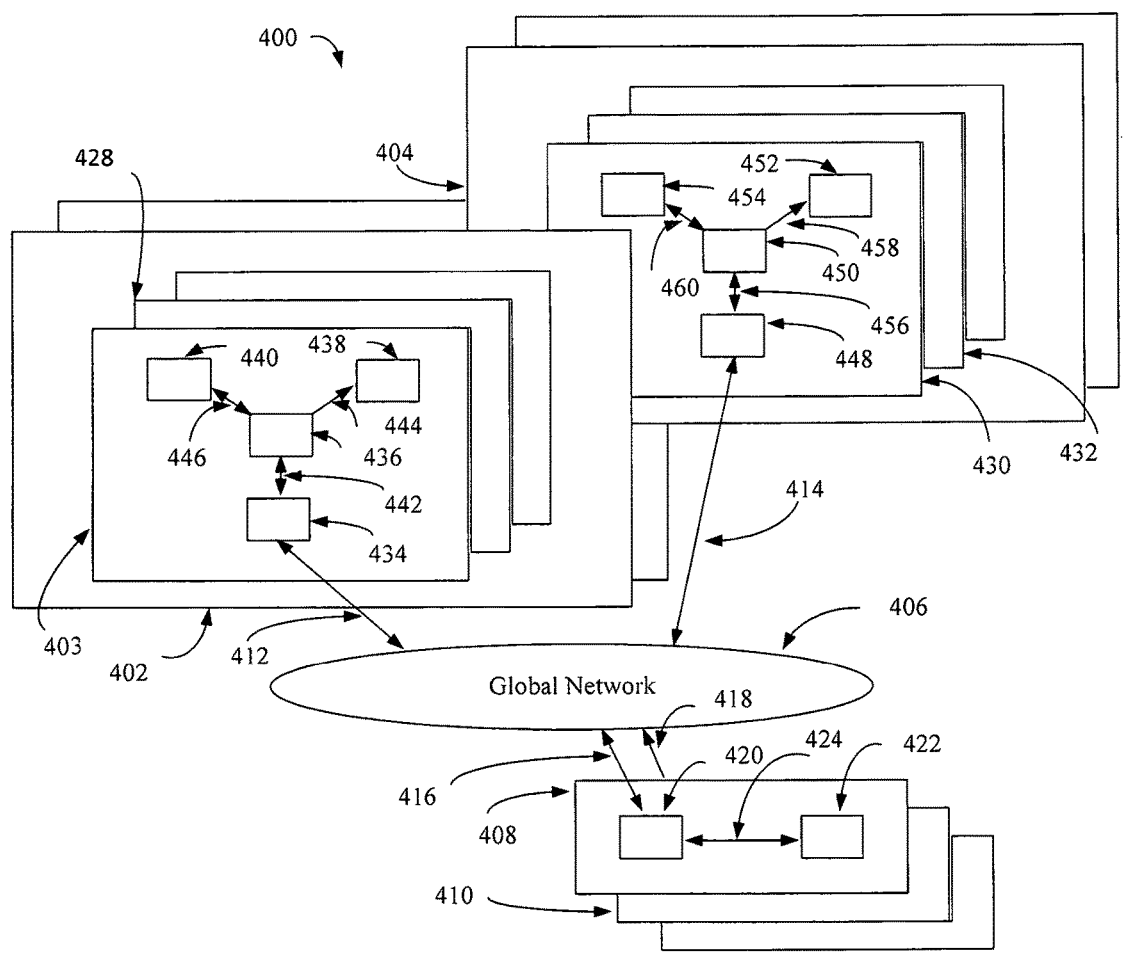
FIG. 4 illustrates an software module architecture of an automatic tool changing system by threading engagement for a CNC Milling machine application depicting a conventional client/server communication system, in accordance with an embodiment of the present invention.

FIG. 4 illustrates a software module architecture of an automatic tool changing system by threading engagement for a CNC Milling machine application depicting a conventional client/server communication system, in accordance with an embodiment of the present invention. In one embodiment, communication system 400 includes a multiplicity of networked regions with a sampling of regions denoted as a network region 402 and a network region 403, a global network 406 and a multiplicity of servers with a sampling of servers denoted as a server device 408 and a server device 410.

In the present embodiment, network region 402 and network region 404 may operate to represent a network contained within a geographical area or region. Non-limiting examples of representations for the geographical areas for the networked regions may include postal zip codes, telephone area codes, states, counties, cities and countries. Elements within network region 402 and 404 may operate to communicate with external elements within other networked regions or within elements contained within the same network region.

In one embodiment, global network 406 may operate as the Internet. It will be understood by those skilled in the art that communication system 400 may take many different forms. Non-limiting examples of forms for communication system 400 include local area networks (LANs), wide area networks (WANs), wired telephone networks, cellular telephone networks or any other network supporting data communication between respective entities via hardwired or wireless communication networks. Global network 406 may operate to transfer information between the various networked elements.

In one embodiment, server device 408 and server device 410 may operate to execute software instructions, store information, support database operations and communicate with other networked elements. Non-limiting examples of software and scripting languages which may be executed on server device 408 and server device 410 include C, C++, C# and Java.

In one embodiment, network region 402 may operate to communicate bi-directionally with global network 406 via a communication channel 412. Network region 404 may operate to communicate bi-directionally with global network 406 via a communication channel 414. Server device 408 may operate to communicate bi-directionally with global network 406 via a communication channel 416. Server device 410 may operate to communicate bi-directionally with global network 406 via a communication channel 418. Network region 402 and 404, global network 406 and server devices 408 and 410 may operate to communicate with each other and with every other networked device located within communication system 400.

In one embodiment server device 408 includes a networking device 420 and a server 422. Networking device 420 may operate to communicate bi-directionally with global network 406 via communication channel 416 and with server 422 via a communication channel 424. Server 422 may operate to execute software instructions and store information.

In one embodiment, network region 402 includes a multiplicity of clients with a sampling denoted as a client 426 and a client 428. Client 426 includes a networking device 434, a processor 436, a GUI 438 and an interface device 440. Non-limiting examples of devices for GUI 448 include monitors, televisions, cellular telephones, smartphones and PDAs (Personal Digital Assistants). Non-limiting examples of interface device 440 include pointing device, mouse, trackball, scanner and printer. Networking device 434 may communicate bi-directionally with global network 406 via communication channel 412 and with processor 436 via a communication channel 442. GUI 438 may receive information from processor 436 via a communication channel 444 for presentation to a user for viewing. Interface device 440 may operate to send control information to processor 436 and to receive information from processor 436 via a communication channel 446. Network region 404 includes a multiplicity of clients with a sampling denoted as a client 430 and a client 432. Client 430 includes a networking device 448, a processor 450, a GUI 452 and an interface device 454. Non-limiting examples of devices for GUI 438 include monitors, televisions, cellular telephones, smartphones and PDAs (Personal Digital Assistants). Non-limiting examples of interface device 440 include pointing devices, mousse, trackballs, scanners and printers. Networking device 448 may communicate bi-directionally with global network 406 via communication channel 414 and with processor 450 via a communication channel 456. GUI 452 may receive information from processor 450 via a communication channel 458 for presentation to a user for viewing. Interface device 454 may operate to send control information to processor 450 and to receive information from processor 450 via a communication channel 460.

For example, consider the case where a user interfacing with client 426 may want to execute a networked application. A user may enter the IP (Internet Protocol) address for the networked application using interface device 440. The IP address information may be communicated to processor 436 via communication channel 446. Processor 436 may then communicate the IP address information to networking device 434 via communication channel 442. Networking device 434 may then communicate the IP address information to global network 406 via communication channel 412. Global network 406 may then communicate the IP address information to networking device 420 of server device 408 via communication channel 416. Networking device 420 may then communicate the IP address information to server 422 via communication channel 424. Server 422 may receive the IP address information and after processing the IP address information may communicate return information to networking device 420 via communication channel 424. Networking device 420 may communicate the return information to global network 406 via communication channel 416. Global network 406 may communicate the return information to networking device 434 via communication channel 412. Networking device 434 may communicate the return information to processor 436 via communication channel 442. Processor 496 may communicate the return information to GUI 498 via communication channel 444. User may then view the return information on GUI 438.

Figure 5:
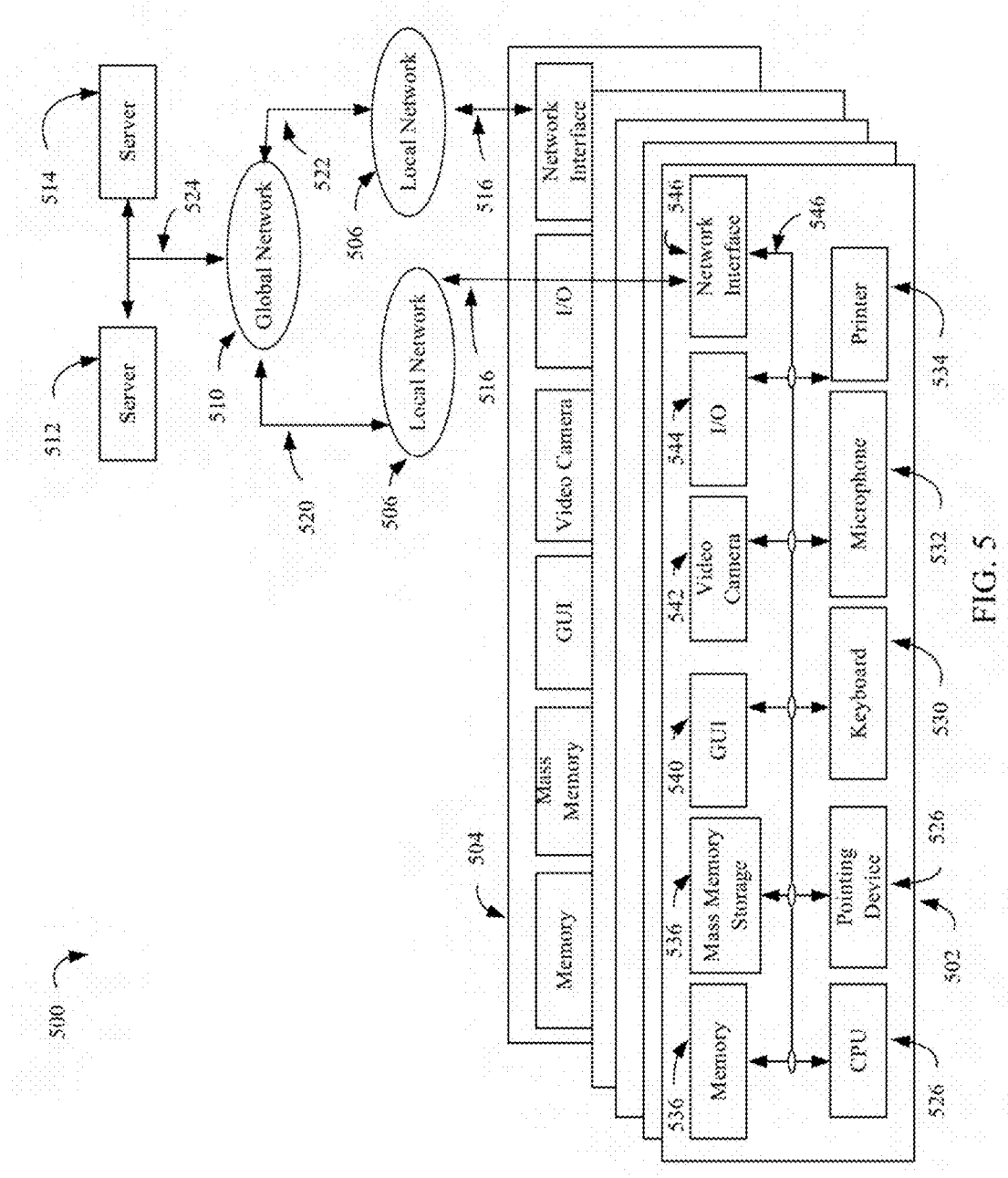
FIG. 5 illustrates an exemplary general computer software module architecture of a system for automatic tool changing by threading engagement for a CNC Milling machine for a web-enabled/networked application platform by which a client/server system may be used, in accordance with an embodiment of the present invention.

FIG. 5 illustrates an exemplary general computer software module architecture of a system for automatic tool changing by threading engagement for a CNC Milling machine for a web-enabled/networked application platform by which a client/server system may be used, in accordance with an embodiment of the present invention. In one embodiment, Communication system 500 includes a multiplicity of clients with a sampling of clients denoted as a client 502 and a client 504, a multiplicity of local networks with a sampling of networks denoted as a local network 506 and a local network 508, a global network 510 and a multiplicity of servers with a sampling of servers denoted as a server 512 and a server 514.

In one embodiment, Client 502 may communicate bi-directionally with local network 506 via a communication channel 516. Client 504 may communicate bi-directionally with local network 508 via a communication channel 518. Local network 506 may communicate bi-directionally with global network 510 via a communication channel 520. Local network 508 may communicate bi-directionally with global network 510 via a communication channel 522. Global network 510 may communicate bi-directionally with server 512 and server 514 via a communication channel 524. Server 512 and server 514 may communicate bi-directionally with each other via communication channel 524. Furthermore, clients 502, 504, local networks 506, 508, global network 510 and servers 512, 514 may each communicate bi-directionally with each other.

In one embodiment, global network 510 may operate as the Internet. It will be understood by those skilled in the art that communication system 500 may take many different forms. Non-limiting examples of forms for communication system 500 include local area networks (LANs), wide area networks (WANs), wired telephone networks, wireless networks, or any other network supporting data communication between respective entities.

In one embodiment, Clients 502 and 504 may take many different forms. Non-limiting examples of clients 502 and 504 include personal computers, personal digital assistants (PDAs), cellular phones and smartphones.

In one embodiment, Client 502 includes a CPU 526, a pointing device 528, a keyboard 530, a microphone 532, a printer 534, a memory 536, a mass memory storage 538, a GUI 540, a video camera 542, an input/output interface 544 and a network interface 546.

CPU 526, pointing device 528, keyboard 530, microphone 532, printer 534, memory 536, mass memory storage 538, GUI 540, video camera 542, input/output interface 544 and network interface 546 may communicate in a unidirectional manner or a bi-directional manner with each other via a communication channel 548. Communication channel 548 may be configured as a single communication channel or a multiplicity of communication channels.

In one embodiment, CPU 526 may be comprised of a single processor or multiple processors. CPU 526 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 536 is used typically to transfer data and instructions to CPU 526 in a bi-directional manner. Memory 536, as discussed previously, may include any suitable computer-readable media, intended for data storage, such as those described above excluding any wired or wireless transmissions unless specifically noted. Mass memory storage 538 may also be coupled bi-directionally to CPU 526 and provides additional data storage capacity and may include any of the computer-readable media described above. Mass memory storage 538 may be used to store programs, data and the like and is typically a secondary storage medium such as a hard disk. It will be appreciated that the information retained within mass memory storage 538, may, in appropriate cases, be incorporated in standard fashion as part of memory 536 as virtual memory.

In one embodiment, CPU 526 may be coupled to GUI 540. GUI 540 enables a user to view the operation of computer operating system and software. CPU 526 may be coupled to pointing device 528. Non-limiting examples of pointing device 528 include computer mouse, trackball and touchpad. Pointing device 528 enables a user with the capability to maneuver a computer cursor about the viewing area of GUI 540 and select areas or features in the viewing area of GUI 540. CPU 526 may be coupled to keyboard 530. Keyboard 530 enables a user with the capability to input alphanumeric textual information to CPU 526. CPU 526 may be coupled to microphone 532. Microphone 532 enables audio produced by a user to be recorded, processed and communicated by CPU 526. CPU 526 may be connected to printer 534. Printer 534 enables a user with the capability to print information to a sheet of paper. CPU 526 may be connected to video camera 542. Video camera 542 enables video produced or captured by user to be recorded, processed and communicated by CPU 526.

In one embodiment, CPU 526 may also be coupled to input/output interface 544 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

In yet another embodiment, CPU 526 optionally may be coupled to network interface 546 which enables communication with an external device such as a database or a computer or telecommunications or internet network using an external connection shown generally as communication channel 516, which may be implemented as a hardwired or wireless communications link using suitable conventional technologies. With such a connection, CPU 526 might receive information from the network, or might output information to a network in the course of performing the method steps described in the teachings of the present invention.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing an automatic tool changing by threading engagement for a CNC Milling machine, according to the present invention will be apparent to those skilled in the art. Various aspects of the invention have been described above by way of illustration, and the specific embodiments disclosed are not intended to limit the invention to the particular forms disclosed. The particular implementation of the automatic tool changing by threading engagement for a CNC Milling machine with machine tooling functions for hole threading, or rigid tapping, may vary depending upon the particular context or application. By way of example, and not limitation, the automatic tool changing by threading engagement for a CNC Milling machine described in the foregoing were principally directed to automatic engagement of machine tooling functions for hole threading, rigid tapping, collet tray and holding means like flats implementations; however, similar techniques may instead be applied to for example, without limitation, automatic tool changers and automatic pallet/tray changers, and tool magazines. Similar techniques may instead also be applied to computer aided manufacturing environments, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising the steps of:
   recognizing a tool change request;
   determining type of said tool change request;
   if said type is pick a tool: positioning a selected collet below a master in engagement with a spindle of a milling machine, the selected collet being held from rotation in an opening of a collet tray being secured to a milling machine table of the milling machine, said positioning using a tool position file comprising positioning information for the selected collet; activating a threading function for engaging the master with the selected collet using a rotation of the spindle; and removing the engaged selected collet from the collet tray; and
   if said type is return a tool: positioning a selected opening of a collet tray below a collet in engagement with a master in engagement with a spindle of a milling machine, the collet tray being secured to a milling machine table of the milling machine; aligning an angle of entry into the selected opening, wherein the collet is held from rotation in the opening of the collet tray, said positioning using a tool position file comprising positioning information for the selected opening; and activating an unthreading function for disengaging the master from the collet using a rotation of the spindle; and further comprising the step of performing a hammering effect for tightening the selected collet to the master.

2. The method as recited in claim 1, in which said hammering effect at least comprises a higher rotation rate than the threading function.

3. The method as recited in claim 1, further comprising the step of performing a hammering effect for untightening the collet to the master.

4. The method as recited in claim 3, in which said hammering effect at least comprises a higher rotation rate than the unthreading function.

5. The method as recited in claim 1, in which said positioning positions the spindle a distance above the selected collet comprising a multiple of a thread pitch of the selected collet.

6. A system comprising:
   a plurality of collets each comprising a top portion and a bottom portion, said top portion comprising a threading means, said bottom portion at least comprising means for holding said collet from rotating and means for retaining an end mill;
   a collet tray comprising at least one opening for each collet, said opening comprising means for holding, said holding means being configured for engaging said holding means of said collet, said collet tray being securable to a milling machine table of a milling machine; and
   a master comprising a top portion and a bottom portion, said top portion being configured for engagement with a spindle of the milling machine, said bottom portion comprising a threading means for engagement with said threading means of each of said collets, wherein said master is retained by the spindle and said collet engages and disengages said master by rotation of the spindle; and
   a non-transitory computer-readable storage medium with an executable program stored thereon, wherein the program instructs one or more processors to perform the following steps:
   recognizing a tool change request;
   determining type of said tool change request;
   if said type is pick a tool: positioning a selected collet, in said collet tray, below said master, said positioning using a tool position file comprising positioning information for said selected collet; activating a threading function for engaging said master with said selected collet using a rotation of the spindle; and removing said engaged selected collet from said collet tray; and
   if said type is return a tool: positioning a selected opening of said collet tray below a collet in engagement with said master; aligning an angle of entry into said opening, said positioning using a tool position file comprising positioning information for said selected opening; and activating an unthreading function for disengaging said master from said collet using a rotation of the spindle; and wherein the program instructs the one or more processors to perform the step of performing a hammering effect for tightening said selected collect to said master, in which said hammering effect at least comprises a higher rotation rate than said threading function.

7. The system as recited in claim 6, further comprising a spring for adjusting a height of said master in the spindle.

8. The system as recited in claim 7, in which said spring seats said top portion of said collet within a cavity of the spindle.

9. The system as recited in claim 6, in which said holding means of said collet and said holding means of said opening each comprise at least one flat.

10. The system as recited in claim 6, further comprising the step of performing a hammering effect for untightening said collet to said master in which said hammering effect at least comprises a higher rotation rate than said unthreading function.

11. The system as recited in claim 6, in which said positioning positions the spindle a distance above said selected collet comprising a multiple of a thread pitch of a thread pitch of said selected collet.

* * * * *